United States Patent [19]
Sigari

[11] Patent Number: 6,100,800
[45] Date of Patent: Aug. 8, 2000

[54] AUTOMATICALLY DEPLOYABLE VEHICLE EMERGENCY WARNING SYSTEM

[76] Inventor: Ali Sigari, 664 Sierra Vista La., Valley Cottage, N.Y. 10989

[21] Appl. No.: 09/217,743

[22] Filed: Dec. 21, 1998

[51] Int. Cl.⁷ ..................................................... B60Q 7/00
[52] U.S. Cl. .......................... 340/473; 340/471; 340/908; 116/63 P
[58] Field of Search ................................. 340/908, 908.1, 340/471, 473, 474, 321, 691.1, 691.2, 691.3, 691.6, 691.7, 693.5; 116/63 P, 63 T, 63 R; 40/573, 612, 610

[56] References Cited

U.S. PATENT DOCUMENTS

| | | | |
|---|---|---|---|
| 2,525,728 | 10/1950 | Sauer | 116/63 P |
| 2,613,463 | 10/1952 | Transue | 116/63 P |
| 2,953,114 | 9/1960 | Hedger | 116/63 P |
| 3,949,701 | 4/1976 | Teixeira | 116/63 P |
| 5,020,466 | 6/1991 | Matzener | 116/63 P |
| 5,606,309 | 2/1997 | Smith | 340/473 |

*Primary Examiner*—Jeffery A. Hofsass
*Assistant Examiner*—Van T. Trieu
*Attorney, Agent, or Firm*—William L. Botjer

[57] ABSTRACT

A vehicle emergency warning system which is suitable for automatic deployment. The vehicle emergency warning system includes first and second movably joined elements bearing warning indicia. The first element may be biased upwardly so as to stand upright with the second element forming a base. The vehicle emergency warning system is compact, lightweight and may be easily moved so that it may be positioned at the front, alongside or in back of the stopped vehicle and is particularly suitable for roof mounting. The vehicle emergency warning system may be folded flat and can be readily built into a compartment in the vehicle so that it may be deployed without the need for the driver or passenger to exit the vehicle.

13 Claims, 2 Drawing Sheets

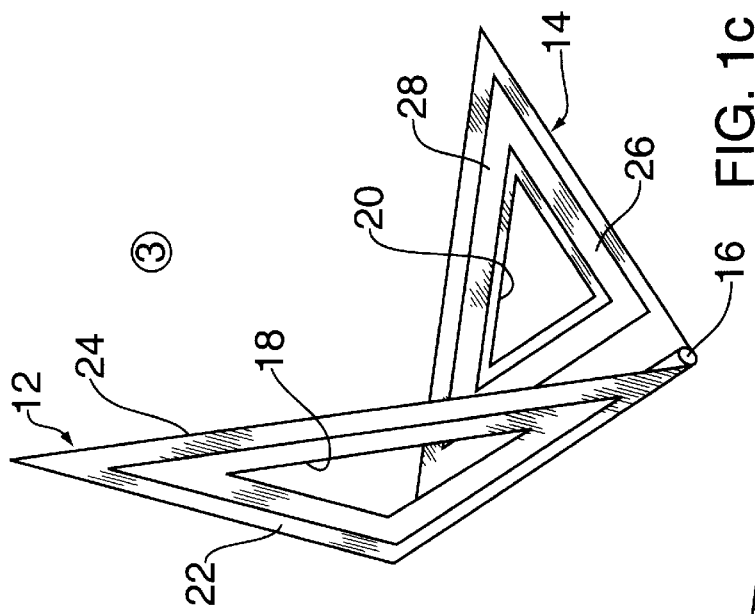
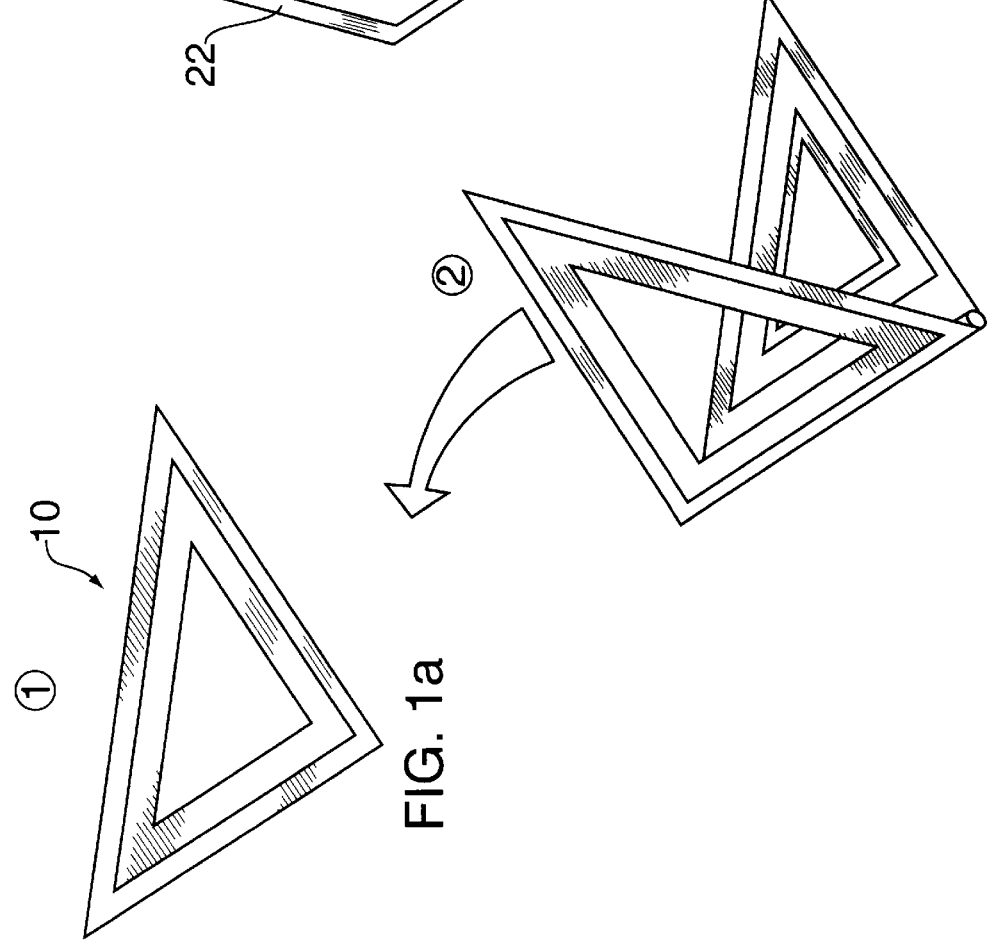
FIG. 1a
FIG. 1b
FIG. 1c

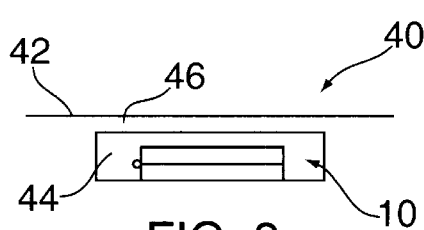
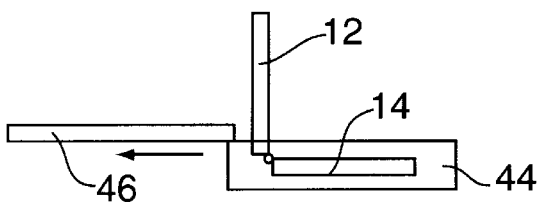
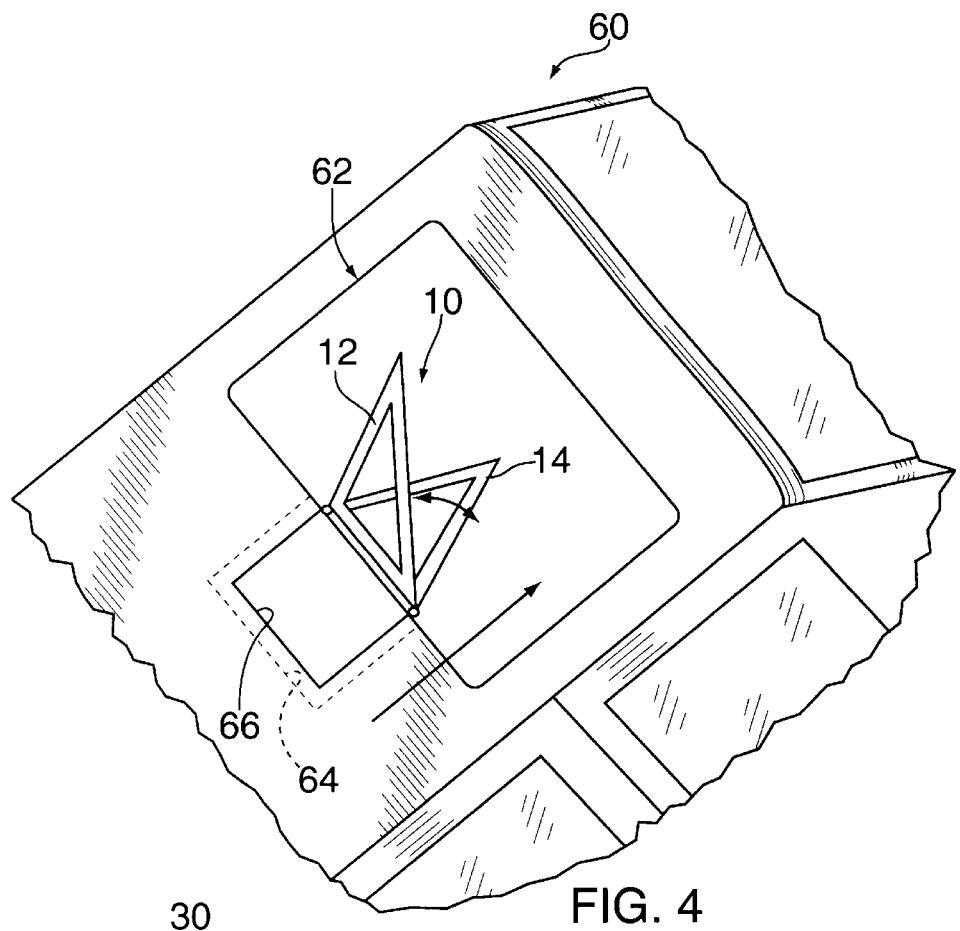
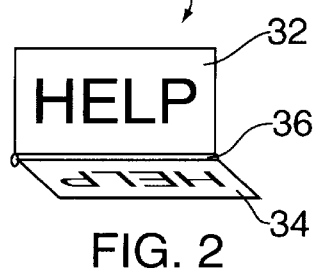

AUTOMATICALLY DEPLOYABLE VEHICLE EMERGENCY WARNING SYSTEM

BACKGROUND AND SUMMARY OF THE INVENTION

The present invention is directed to a vehicle emergency warning system, and particularly to a vehicle emergency warning system that may be automatically deployed without the need for the driver of the vehicle to exit the vehicle.

Despite improvements in reliability, vehicles such as trucks, automobiles and trailers are still subject to breakdowns which require the vehicle to stop either on the road or alongside it. Such a stopped vehicle presents a danger to it's passengers and to oncoming vehicles which may be unaware that the other vehicle is not moving. The flashing warning lights, "emergency flashers", that are part of the standard equipment of automobiles and trucks sold today are often ineffectual since they are indistinguishable from standard brake and taillights and thus are easily ignored. Furthermore, in the case of a battery failure or other electrical problem, the emergency flashers can also be disabled.

The prior art contains numerous "Safety Kits" which may be carried in the vehicle and used to warn oncoming vehicles that the vehicle is stopped and/or to request assistance. A problem with such safety kits is that the operator of the stopped vehicle must find and retrieve the safety kit from wherever it is stored in the vehicle, assemble it, and place it on or alongside the vehicle. However by the time the safety kit is found, retrieved, assembled and positioned a serious accident may have already taken place. The present invention is directed to a vehicle emergency warning system that is readily automatically deployable without the need for retrieval, assembly and positioning and without the need for the driver or passenger to leave the vehicle. The present vehicle emergency warning system is compact, yet is easily viewable from the front, back and top of the vehicle. The design and construction of the inventive vehicle emergency warning system enables it to be readily built into a vehicle without the need for an extensive redesign.

The present invention is directed to a vehicle emergency warning system which is suitable for automatic deployment. The vehicle emergency warning system includes first and second movably joined elements bearing warning indicia. The first element is biased upwardly so as to stand upright with the second element forming a base. The vehicle emergency warning system is compact, lightweight and may be easily moved so that it may be positioned, depending on the type of the vehicle, at the front, alongside or in back of the stopped vehicle and is particularly suitable for roof mounting. The vehicle emergency warning system may be folded flat and can be readily built into a compartment in the vehicle so that it may be deployed without the need for the driver or passenger to exit the vehicle.

BRIEF DESCRIPTION OF THE DRAWINGS

For a better understanding of the invention, reference is made to the following drawings which are to be taken in conjunction with the detailed description to follow in which:

FIGS. 1a, 1b and 1c are perspective views of a first embodiment of a vehicle emergency warning system in accordance with the present invention;

FIG. 2 is a perspective view of second embodiment of a vehicle emergency warning system in accordance with the present invention;

FIGS. 3a and 3b are sectional views of the vehicle emergency warning system mounted as a part of a vehicle in a storage unit; and FIG. 4 is a perspective view the roof section of an automobile which includes a roof mounted hatch such as a sunroof or moonroof with the present invention incorporated therein.

DESCRIPTION OF THE PREFERRED EMBODIMENTS

FIGS. 1a, 1b and 1c are perspective views of a vehicle emergency warning system 10 in accordance with the present invention as it is erected. Vehicle emergency warning system 10 includes a first element 12 and a second element 14 joined by a hinge 16 which permits the first 12 and second 14 elements to be folded together in a face to face relationship (FIG. 1a) and permits element 12 to be raised to a vertical position (FIG. 1b). As is shown in FIGS. 1, elements 12 and 14 are in form of a "safety triangle" which is an internationally recognized warning symbol. Thus element 12 has a triangular opening 18 and element 14 has a triangular opening 20 which also serve to lighten the weight of unit 10 and make it less likely to be affected by wind. The forward face 22 and rearward face 24 of element 12 and the upper face 26 of element 14 may preferably include reflective material 28 so as to increase visibility at night.

Hinge 16 may preferably include a biasing mechanism such as a spring, to urge element 12 into a vertical position and a stop, so that element 12 will stop at the vertical position. When element 12 is in a vertical, upright position (FIG. 1c) element 14 will form a base for supporting vehicle emergency warning system 10. When element 12 is in the upright position the unit can easily be seen from the front, back and top (element 14 is horizontal and thus can be seen clearly from the air). In storage elements 12 and 14 are folded togther into an extremely compact flat form which is readily stored in a vehicle. Since vehicle emergency warning system 10 is lightweight and easily moved it may be positioned at the front, alongside or in back of the stopped vehicle. More preferably vehicle emergency warning system 10 is positioned atop the vehicle as this will permit it to be seen from the front rear and above the vehicle from a greater distance. As is discussed in detail below, the construction of the present vehicle emergency warning system permits it to be built into the hood, trunk, or roof of the vehicle so that it may be deployed automatically without the need for the driver or passengers to exit the vehicle.

The present invention is not limited to any particular shape, such as a safety triangle, in FIG. 2 a vehicle emergency warning system 30 which has a first element 32 and a second element 34, which are rectangular in shape and which are joined by hinge 36 to permit the elements to be folded togther and to permit element 32 to assume an upright position with element 34 forming the base. The faces of elements 30 and 32 may include indicia such as "HELP", a large "H" or any other suitable warning and/or request for assistance. The operation of vehicle emergency warning system 30 is otherwise identical to that of vehicle emergency warning system 10 described above.

FIGS. 3a and 3b illustrate vehicle emergency warning system 10 mounted as a part of the vehicle in a storage unit 40 mounted flush with the surface 42 of a vehicle. Storage unit 40 includes a compartment 44 with a displaceable hatch 46 which may be slidable or pivotable to permit vehicle emergency warning system 10, which is stored in a folded configuration, to be exposed. After opening of hatch 46 vehicle emergency warning system 10 is activated so as to permit element 12 to pivot into its upright position to display the warning indicia. Storage unit 40 may be located along any external surface of the vehicle, such as the sides, trunk, hood or roof. Roof mounting is generally preferable since it provides the greatest visibility for vehicle emergency warning system 10. Both hatch 46 of storage unit 40 and vehicle emergency warning system 10 may be either electrically or mechanically activated. Mechanical actuation is preferable since it permits vehicle emergency warning system 10 to be actuated even in the event of an electrical failure in the vehicle.

As described above, the roof of an automobile is a preferred location for vehicle emergency warning system 10, furthermore as many vehicles are already equipped with a hatch, such as a "sunroof" or "moonroof", the present invention may be readily incorporated into the roof mounted hatch mechanism. FIG. 4 is a perspective view the roof section 60 of an automobile 62 which includes a standard roof mounted hatch 64 such as a sunroof or moonroof. Incorporated into the roof portion is a recess 66 which includes a storage compartment 68 in which vehicle emergency warning system 10 is stored. Storage compartment 68 is preferably slidably displaceable so that it may be slid forward into the hatch opening after the hatch 64 has been opened. This location is particularly advantageous as the vehicle emergency warning system may be deployed by controls mounted on the inside of the roof of the vehicle which can be easily and very quickly reached by the driver or passengers of the vehicle.

The invention has been described with respect to preferred embodiments. However, as those skilled in the art will recognize, modifications and variations in the specific details which have been described and illustrated may be resorted to without departing from the spirit and scope of the invention as defined in the appended claims.

What is claimed is:

1. A vehicle emergency warning system comprising:
   a first element having a first side and a second side, the first and second sides having warning indicia disposed thereon;
   a second element movably joined to said first element, said second element having a first side and a second side and warning indicia disposed on at least one of said first and second sides;
   said first and said second elements being joined so that they may be folded together in a first stored flat configuration and in an second active configuration such that the first element may be disposed vertically to expose the warning indicia disposed on the first and second sides, with the second element disposed horizontally such that the warning indicia disposed thereon faces upwardly, so that the warning indicia of the first element may be seen from the front and rear and the warning indicia of the second element may be seen from above.

2. The vehicle emergency warning system as claimed in claim 1, wherein the first and second elements are in the form of a safety triangle.

3. The vehicle emergency warning system as claimed in claim 1, wherein the first and second elements are rectangular in form.

4. The vehicle emergency warning system as claimed in claim 1, wherein the first and second elements are spring biased so that the first element is urged into the vertical position.

5. The vehicle emergency warning system as claimed in claim 1, wherein the first and second elements are stored in an externally accessible storage compartment.

6. A vehicle emergency warning system for use in a vehicle having at least one external surface, the improvement comprising:
   a) a storage compartment disposed proximate the external surface of the vehicle;
   b) hatch means for permitting external access to the storage compartment;
   c) a vehicle emergency warning system stored in said storage compartment, said vehicle emergency warning system having a first element having a first side and a second side, the first and second sides having warning indicia disposed thereon, a second element movably joined to said first element, said second element having a first side and a second side and warning indicia disposed on at least one of said first and second sides, said first and said second elements being joined so that the first element may be disposed vertically to expose the warning indicia disposed on the first and second sides, with the second element disposed horizontally such that the warning indicia disposed thereon faces upwardly; and
   d) deployment means, located within the vehicle for activating the vehicle emergency warning system without the operator having to exit the vehicle, said deployment means causing said first element to extend vertically through said hatch means so that the warning indicia of the first element may be seen from the front and rear and the warning indicia of the second element may be seen from above.

7. The vehicle emergency warning system as claimed in claim 6 wherein the storage compartment is disposed proximate to a moon or sun roof of the vehicle with the moon or sun roof forming the hatch means to access the storage compartment.

8. The vehicle emergency warning system as claimed in claim 6 wherein the deployment means comprise manual means disposed within the vehicle proximate to the roof of the vehicle.

9. The vehicle emergency warning system as claimed in claim 6 wherein the storage compartment is slidably mounted proximate to a moon or sun roof of the vehicle with the moon or sun roof forming the hatch means to access the storage compartment.

10. The vehicle emergency warning system as claimed in claim 6 wherein the storage compartment is disposed proximate to the trunk of the vehicle.

11. The vehicle emergency warning system as claimed in claim 6, wherein the first and second elements are in the form of a safety triangle.

12. The vehicle emergency warning system as claimed in claim 6, wherein the first and second elements are rectangular in form.

13. The vehicle emergency warning system as claimed in claim 6, wherein the first and second elements are spring biased so that the first element is urged into the vertical position.

* * * * *